(12) United States Patent
Marion et al.

(10) Patent No.: US 7,054,101 B1
(45) Date of Patent: May 30, 2006

(54) SYSTEM FOR HIGH DENSITY LINEAR SERPENTINE DATA RECORDING

(75) Inventors: Jack L Marion, Rock River, WY (US); Peter L Groel, Longmont, CO (US)

(73) Assignee: Moutain Engineering II, Inc.

( * ) Notice: Subject to any disclaimer, the term of this patent is extended or adjusted under 35 U.S.C. 154(b) by 126 days.

(21) Appl. No.: 10/065,485

(22) Filed: Oct. 23, 2002

(51) Int. Cl.
*G11B 5/008* (2006.01)
*G11B 21/08* (2006.01)
*G11B 5/55* (2006.01)

(52) U.S. Cl. .......................... 360/90; 360/261

(58) Field of Classification Search .................. 360/90, 360/260, 88, 83, 81, 220, 221, 251, 251.1, 360/251.4, 261, 261.1, 241, 241.1, 241.2, 360/241.3
See application file for complete search history.

(56) References Cited

U.S. PATENT DOCUMENTS

| | | | | |
|---|---|---|---|---|
| 5,166,848 A | * | 11/1992 | Plachy | 360/291.7 |
| 5,883,770 A | * | 3/1999 | Biskeborn et al. | 360/130.21 |
| 6,249,401 B1 | * | 6/2001 | Zwettler | 360/132 |
| 6,369,982 B1 | * | 4/2002 | Saliba | 360/122 |
| 6,822,820 B1 | * | 11/2004 | Winarski et al. | 360/69 |

* cited by examiner

*Primary Examiner*—Julie Anne Watko

(57) ABSTRACT

A recording system comprises a read-write head with a length that is substantially smaller than the width of the tape, the small mass of the head allows high frequency track following. The head contacts only that area of the tape currently being accessed, significantly reducing the tape and the head wear. The head flies over the tape with the flying height tightly controlled even at high tape speed and low tape tension. Several methods to stabilize the tape in the recording area are disclosed. The stabilizer can be a second recording head allowing dual sided recording. A first implementation uses a linear actuator and a second implementation uses a rotary actuator. A mechanism moves the head from the path of a threading mechanism.

7 Claims, 14 Drawing Sheets

SYSTEM FOR HIGH DENSITY LINEAR SERPENTINE DATA RECORDING

BACKGROUND OF INVENTION

Several methods to record data on magnetic tape are known. Among those are helical scan, arcuate scan, and linear recording. The present invention relates to linear recording.

A typical tape drive for linear recording is shown in FIG. 1. It comprises of a supply reel 2 and a take up reel 3. One or both reels may be enclosed in a cartridge. The tape 6 is moved under the control of a servo system (not shown) between the supply reel and the take up reel past a read-write head 10. A plurality of bearings 4 may be used to guide the tape.

Linear recording devices write the data in individual data tracks parallel to the edge of the recording media. FIG. 2 depicts a typical configuration. Recording media 6 is moved in direction of arrow D1 across the surface of a read/write head 10. The head contains several write elements 11, each of which writes one data track 12 on magnetic tape 6. The head also contains a number of read elements 13. Typically, there are one or two read elements for each write element.

When retrieval of previously recorded data from tape is desired, the media is moved again across the head and the read elements 13 receive the magnetic signal from the media and generate electrical signals that can be decoded by appropriate circuitry. The read elements are also used during a recording operation to ensure that data has been recorded correctly. After the media has moved past the write elements 11 and data has been recorded, the media moves past the read elements 13. The data of each track is read and compared to the data that was written onto that track. Any recording error is detected and an appropriate error correction procedure can be taken. Recording errors can be caused by media defects, contamination of the media, contamination of the head elements, and by other reasons.

It is desired to increase the recording capacity of the tape. This may be achieved is by increasing the number of recording tracks and by increasing the linear density. Newer tape drives commonly have hundreds of parallel tracks. The example shown in FIG. 2 does not support the high track density of newer tape drives. It is not practical to manufacture a head with several hundred of read and write elements. Tape drive manufacturers have therefore adopted a technology called serpentine recording.

Only a small number of tracks is written when the tape is moved across the head, typically between 4 and 18 tracks. When the end of the tape is reached, the head is moved to a different, not-yet recorded area of the tape and a second set of tracks is written while the tape is moved in the opposite direction. When the beginning of the tape is reached, the head is moved again and the tape reverses direction again. This process is repeated until all areas of the tape have been accessed. On some tape drives the number of passes made before the tape has been completely written can exceed 100. This figure will increase in the future.

FIG. 3a shows an exemplary method of serpentine recording. The head (not shown) is first positioned to the upper edge of the tape. The tape is moved in direction indicated by arrow D1 and the track group 20 is recorded. When the end of tape is reached, the head is moved and track group 30 is recorded, while the tape is moved in the opposite direction as indicated by arrow D2. This process continues until the entire tape has been recorded. FIG. 3a shows track group 50 as the last group to be recorded. Although FIG. 3a shows only 3 groups, there may be a plurality of track groups recorded between track group 30 and track group 50. The number of track groups recorded is preferably an even number. When recording of the last group is completed, the tape is back at the starting point, avoiding the necessity to rewind the tape.

Several variations of serpentine recording are known. For example, the recording may commence by writing a track group in the middle of tape. The next group may be located above or below the first group. The third group may then be located on the opposite side of the middle group than the second group. The fourth group may then be located adjacent to the second group, and so on. The tape will be recorded in this manner from the middle of the tape, in an alternating fashion, towards both edges.

FIG. 3b shows another variation. The elements of the head are spaced further apart so that a row of elements may span, for example, ¼ of the width of the tape. The data are written in four track groups 20, 30, 40, and 50. In the example in FIG. 3b the recording of track group 20 has been completed. Track group 30 is in the process of being recorded, while track groups 40 and 50 have not been recorded yet. In this example four tracks are written simultaneously. In a different embodiment the number of tracks written simultaneously may differ and the distance between the tracks may also differ.

The process of recording track group 30 will now be described. The recording of the other 3 groups follows the same method as the recording of track group 30.

After writing the first set of tracks 31, 32, 33, and 34, while the tape is moved in direction of D1, the head (not shown) is moved by a small increment and tracks 35, 36, 37, and 38 are written while the tape is moved in direction D2. Thereafter the head is moved again and the next set of tracks (not shown) is written in direction D1. This process is repeated until the area between the original tracks is recorded. After this section of the tape has been recorded, the head is moved by a large distance and track group 40 is recorded. Thereafter the head is moved again by a large distance and of track group 50 is recorded.

Independent of the particularity of the implementation of the serpentine recording, there are several disadvantages that are common to all implementations. FIG. 4 shows two positions of the read/write head 10. At position P1 the track group nearest to the upper edge of the tape is recorded or read. The location of the read and write elements is shown by outline 14. At position P2 the track nearest to the lower edge of the tape is recorded or read. The surface of the head must support the tape 6 in either position. The length l of the head must be substantially twice the width w of the tape 6.

FIG. 5 shows a head 60 that has a surface 61 over which the tape (not shown) is moved. A plurality of write elements 62 are grouped closely together. The spacing of the write element matches the intended track spacing on tape. On either side of the write elements is a group of read elements. When tape is moved in direction of arrow D1, read elements 63 are used to verify data written by the write elements. When tape is moved in direction of arrow D2, read elements 64 are used to verify data written by the write elements. The length l of the surface 61 must be sufficient to support the tape independent of which track group is recorded.

The large size of the head is disadvantageous for several reasons. First, the overall size of newer tape drives is getting smaller. A large head poses an obstacle to the miniaturization effort. Second, the large mass of the head limits the operation of a actuator. This will be described in detail below.

Third, the large number of passes of the head over the tape increases tape wear and head wear. This will also be described in detail below.

The narrow track width of newer tape drives requires the head to be positioned precisely at the intended position. Manufacturing tolerances of the head, combined with inaccuracies of the tape and fluctuations of the tape movement across the head, make this precision difficult to achieve. Most newer tape drives, therefore, adopt a technique called "track following" to overcome this difficulty. The media manufacturer typically writes one or several highly precise servo tracks onto the tape. Special elements in the head are used to decode the servo tracks when the tape is recorded or read in a tape drive. The information from the servo tracks is used to obtain the relative position of the head to the media. A head actuator is then used to move the head to the correct position. The position of the head is adjusted constantly as the tape is moved over the head. Several methods of track-following systems are known. The closed-loop systems help to maintain the proper head-to-tape alignment. However, the mass of the head limits the frequency response of the system. This limitation is undesirable since further decreases in the track width cannot be achieved without a fast track-following system. A read/write head that has a low mass is therefore desirable.

The current method where tape flies over the head also poses a formidable obstacle when attempting to increase the linear density of tape.

In order to increase the linear density of the recording the tape has to be in close proximity of the read and write elements. When the tape moves over the recording surface of the head air gets trapped between the head surface and the tape. This air film separates the tape from the head. This self-lubrication of the air film is desirable since it reduces tape wear. However, as the recording densities increase, the separation between the tape and the head must be decreased. Several parameters influence the flying height of the tape over the head, including the tape speed, tape tension and the head contour. It is desirable to increase the recording speed of the tape in order to decrease the recording time. The increased tape speed will increase the flying height of the tape.

While the tape is moved over the head, the tape is held under a controlled tension. The tension used is generally proportional to the thickness of the tape. It is desirable to decrease the tape thickness in order to increase the tape length and the recording capacity. The increasingly thinner tapes are wound with lower tensions. The lower tension increases the flying height of the tape over the head. Therefore a head that allows a low flying height at a high tape speed and at a low tape tension is therefore most desirable.

An additional problem with the current method is increased tape wear and contamination of the head as a result of the tape wear. When tape moves over the head an air film between the tape and the head may separate the tape from the head. However when tape movement is stopped, the air film dissipates and the still-moving tape contacts the head. The friction between the tape and the head causes wear of the tape and the head. This wear limits the lifetime of both the tape and the head. In addition, loose particles of debris collect on the head and on the tape, resulting in read and write errors.

Referring now again to FIG. 4, we can see that current methods are causing excessive tape wear. For example, when the head 10 is in position P2, track group 50 at the lower edge of tape is recorded and verified. Head 10 spans over all previously recorded data groups. However, the previously recorded data cannot be verified again when the tape moves over the head to record track group 50. The number of tracks recorded on tape is increasing faster than the number of tracks recorded in parallel. This leads to an increase in the number of times the tape passes over the read-write head before the entire tape is recorded. The high number of passes, combined with the lack of verification, poses a serious risk to the reliability of the data.

It is now clear that an improved read/write head is desired.

It is an object of the present invention to reduce the size of the read/write head to allow miniaturization of the tape drive.

It is another object of the present invention to reduce the mass of the head to improve the frequency response of the track-following system.

It is another object of the invention to control the separation between the head and the tape.

It is another object of the invention to reduce the tape and the head wear.

It is another object of the invention to reduce the tape and the head contamination.

SUMMARY OF INVENTION

The read and write elements of the inventive head are contained in a housing that is only slightly larger than the row of recording elements. The size of the head substantially matches the width of one recording group and is significantly smaller than the width of the tape.

The head and the actuator are designed so that the head will fly over the moving tape. The head is pushed against the tape by a force to minimize and to control the flying height of the head over the tape. The tape is stabilized to provide a uniform surface for the head. The device used to stabilize the tape may be a hydrostatic bearing, a hydrodynamic bearing, a second read-write head, a roller bearing, or another suitable device.

BRIEF DESCRIPTION OF DRAWINGS

FIG. 13 show a side view of the head assembly whereas the head is moved from the tape path to allow threading of the tape.

DETAILED DESCRIPTION

Figure 1:
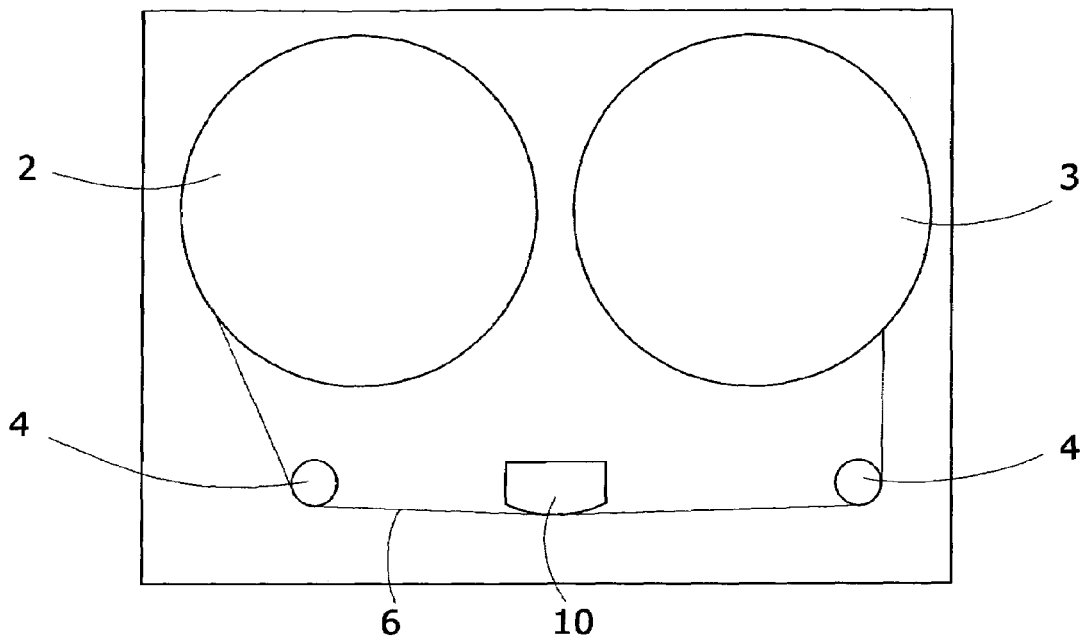
FIG. 1 is an illustration of prior art showing a typical tape drive. (previously described)
Figure 2:
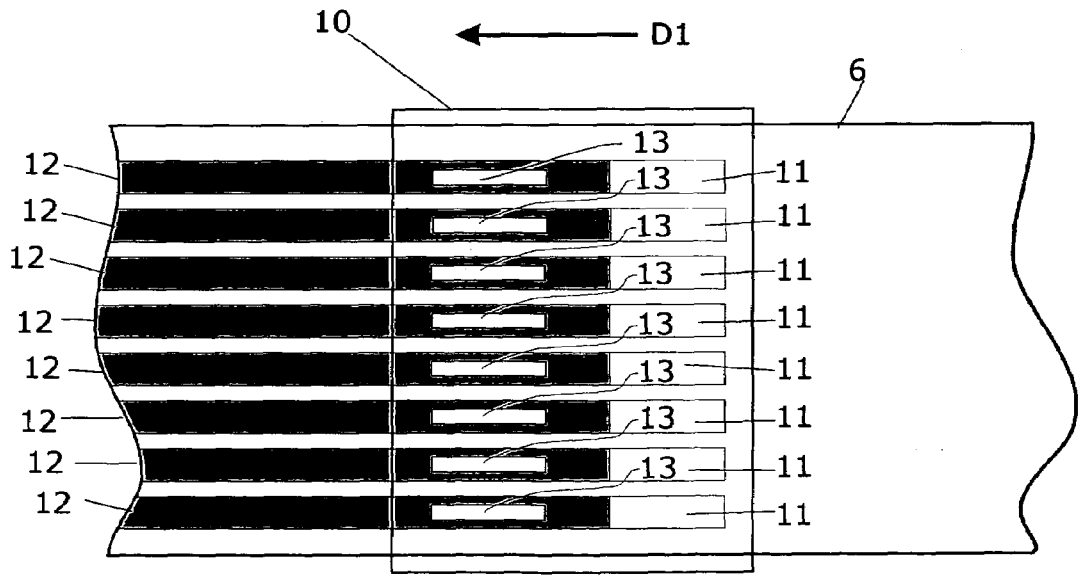
FIG. 2 depicts a prior art example of linear recording. (previously described)
Figure 3A:
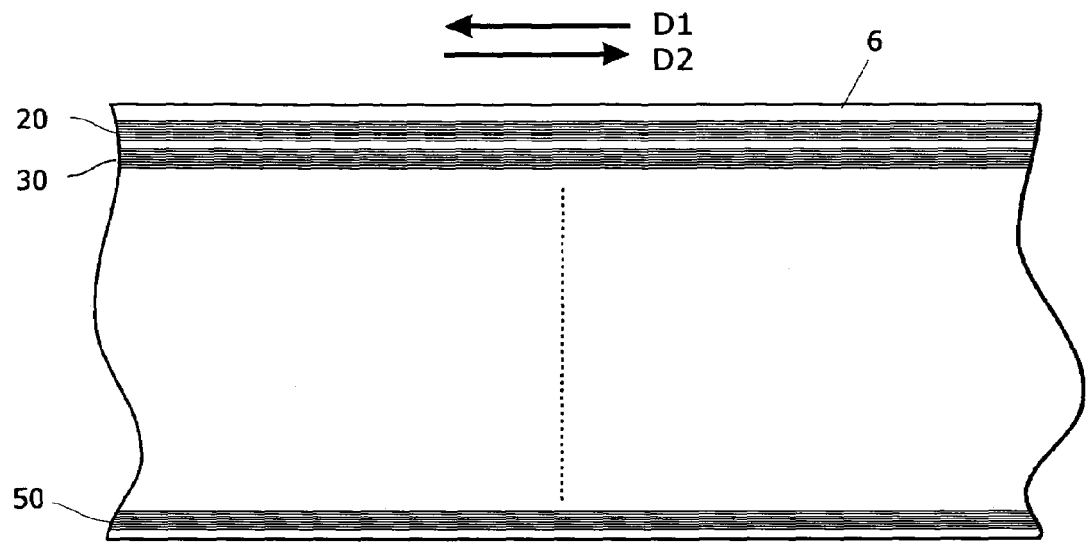
FIG. 3*a* shows a prior art example of serpentine recording. (previously described)
Figure 3B:
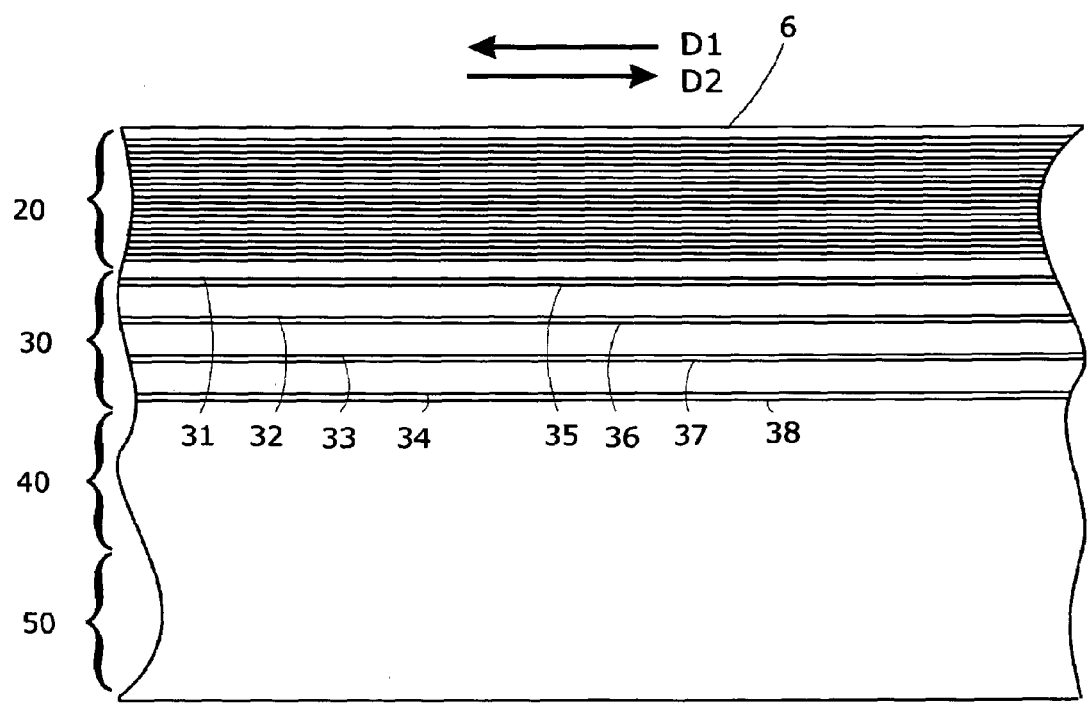
FIG. 3*b* shows a variation of a prior art example of serpentine recording. (previously described)
Figure 4:
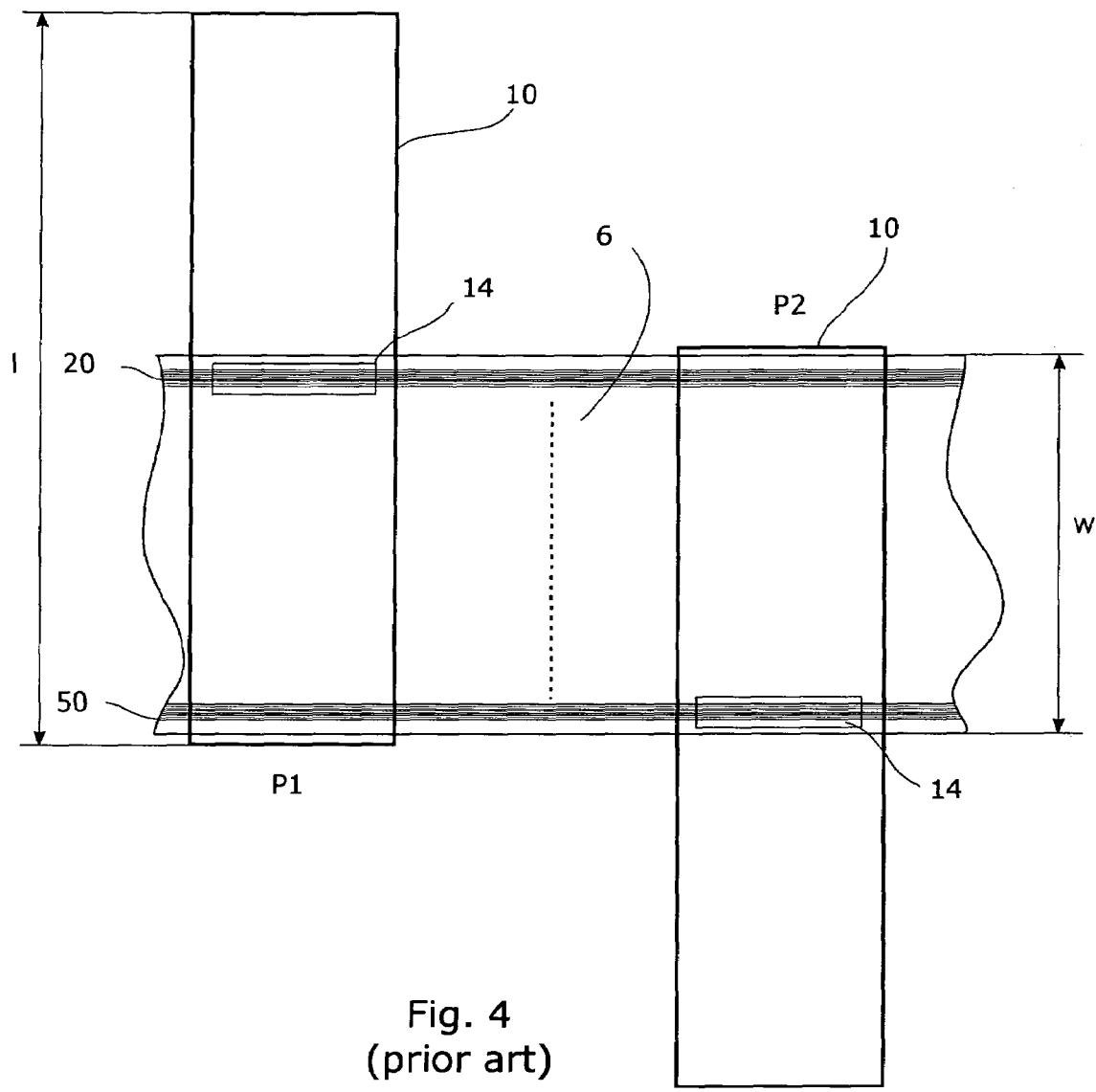
FIG. 4 depicts two positions of a prior art read-write head. (previously described)
Figure 5:
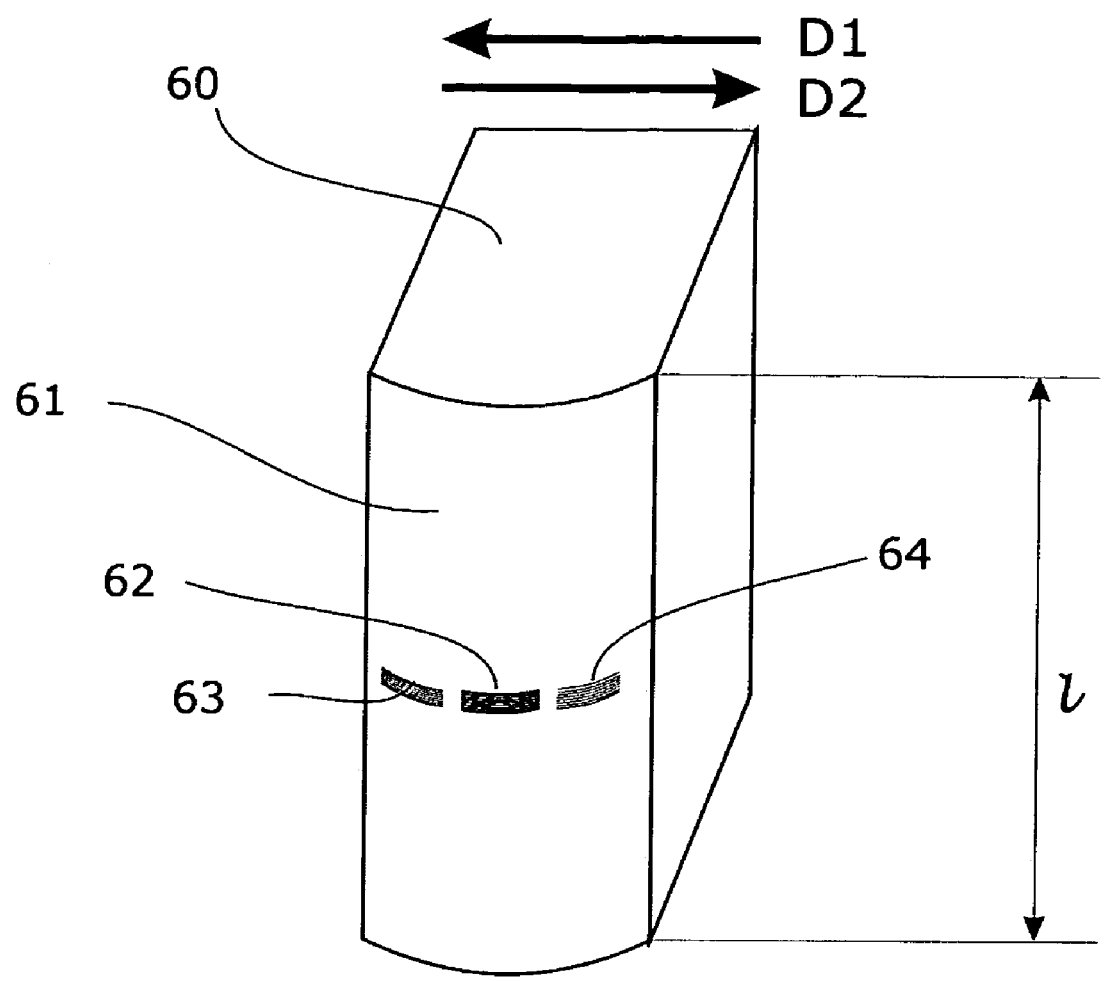
FIG. 5 shows an example of a prior art read-write head. (previously described)
Figure 6:
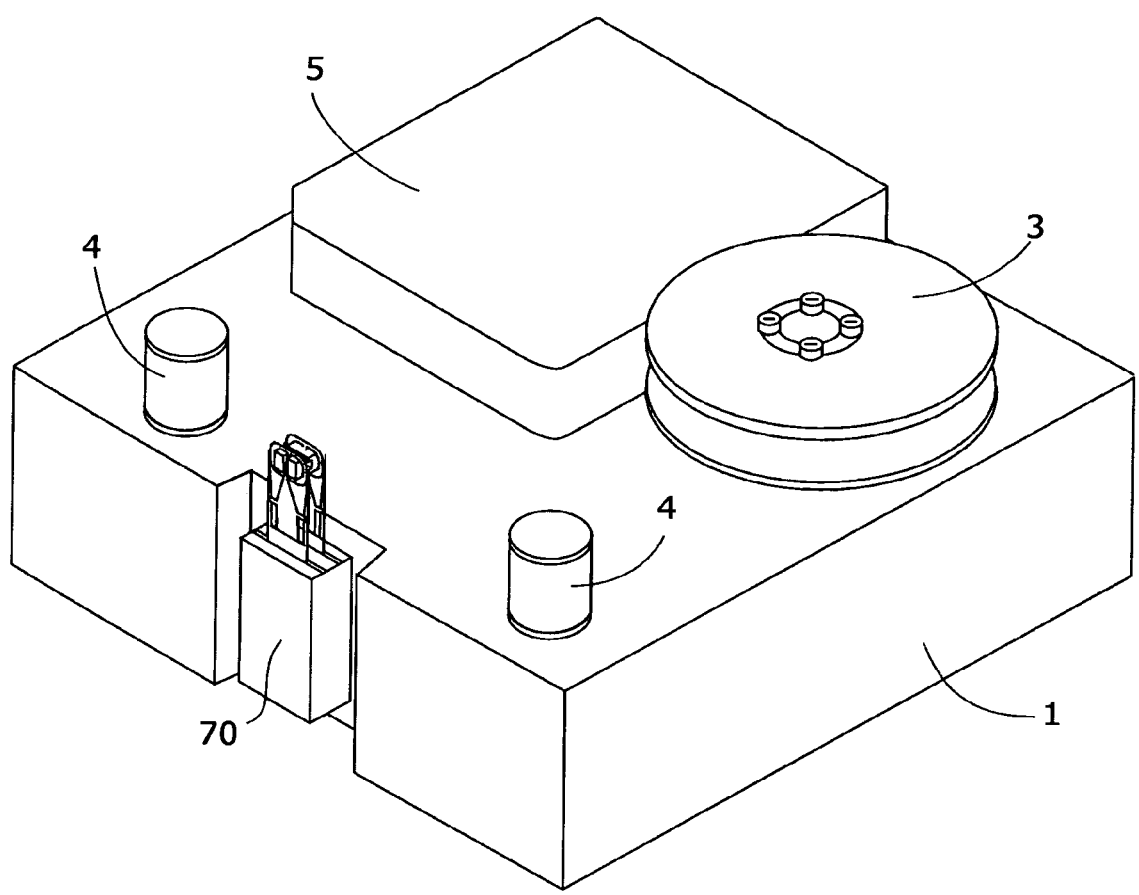
FIG. 6 shows a typical tape drive with a first embodiment of the inventive read-write head assembly.

FIG. 6 shows an exemplary tape drive with the inventive head assembly 70. A take-up reel 3, two tape guides 4, and a tape cartridge 5 with an enclosed supply reel (not shown) are mounted on a base 1. The tape (not shown) is wound from the supply reel in cartridge 5 over two tape guides 4 to the take-up reel 3 past the read-write head assembly 70. The head assembly 70 is shown in greater detail in FIG. 7a.

A base 71 contains an actuator that is capable of moving the read-write head in the directions of arrow A. Actuators of many different designs are known. Voice coil driven actuators are used in high performance tape drives because of their ability to move the head at a high speed and with a fast acceleration. They can be designed to move the head over the required length so that the head elements can access all recorded areas of the tape. Actuators using piezo elements are also very fast but have a limited operating range. Actuators using motor driven lead screws are able to move the head over the required range but they are very slow. They are therefore generally used in low performance, low-density-tape drives. They are also used in high performance tape drives in combination with voice coil actuators and piezo actuators. The lead screw is used to move the head to the desired track group. Typically this is done only at the beginning of tape and at the end of tape. While tape is moving, the piezo actuator or the voice coil actuator is used to for closed loop track following. Other designs in addition to the above-described actuators are used and may be used in the future. The present invention is independent from the type of actuator used.

Figure 7A:
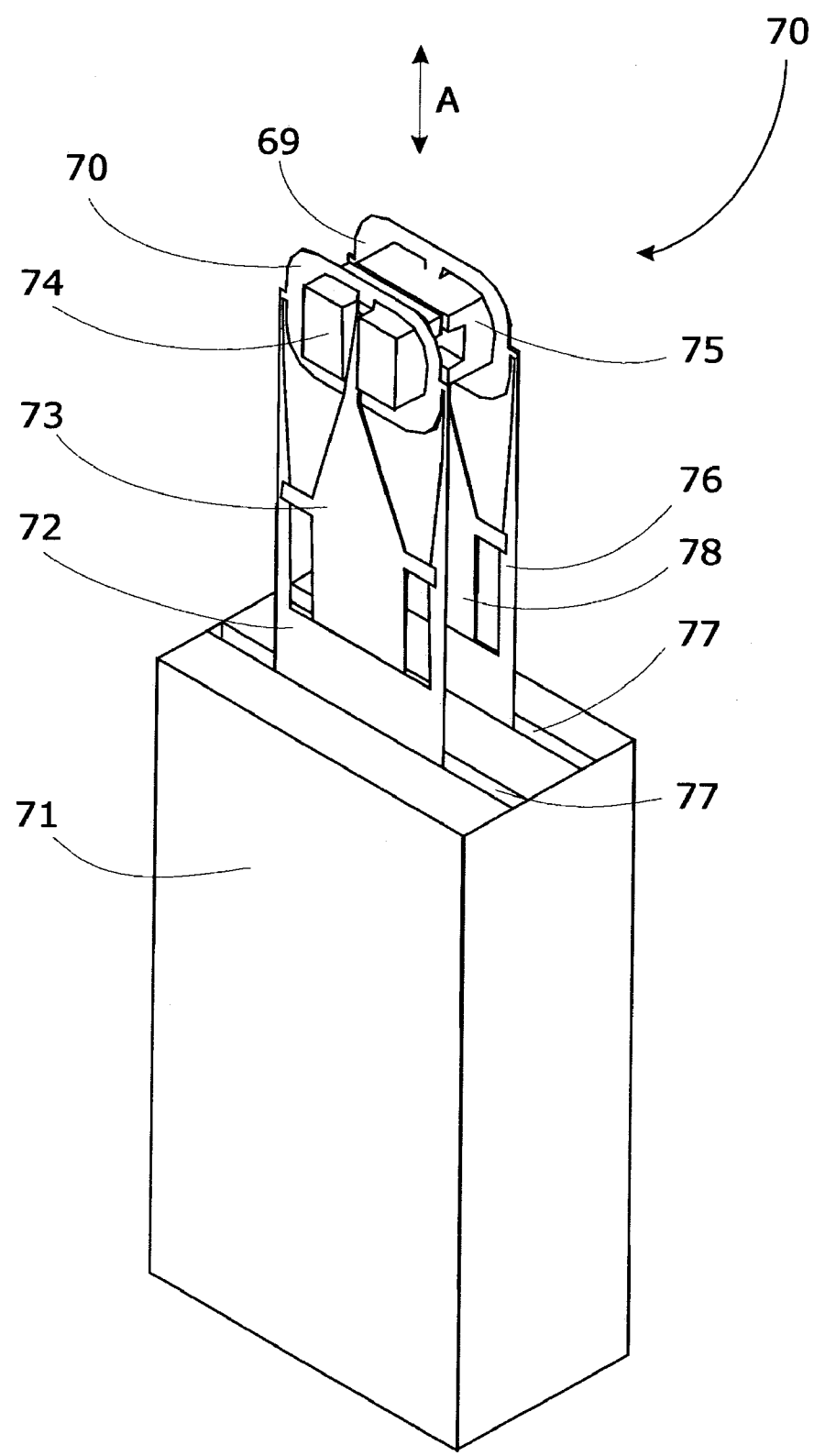
FIG. 7*a* shows the inventive head assembly in greater detail.
Figure 7B:
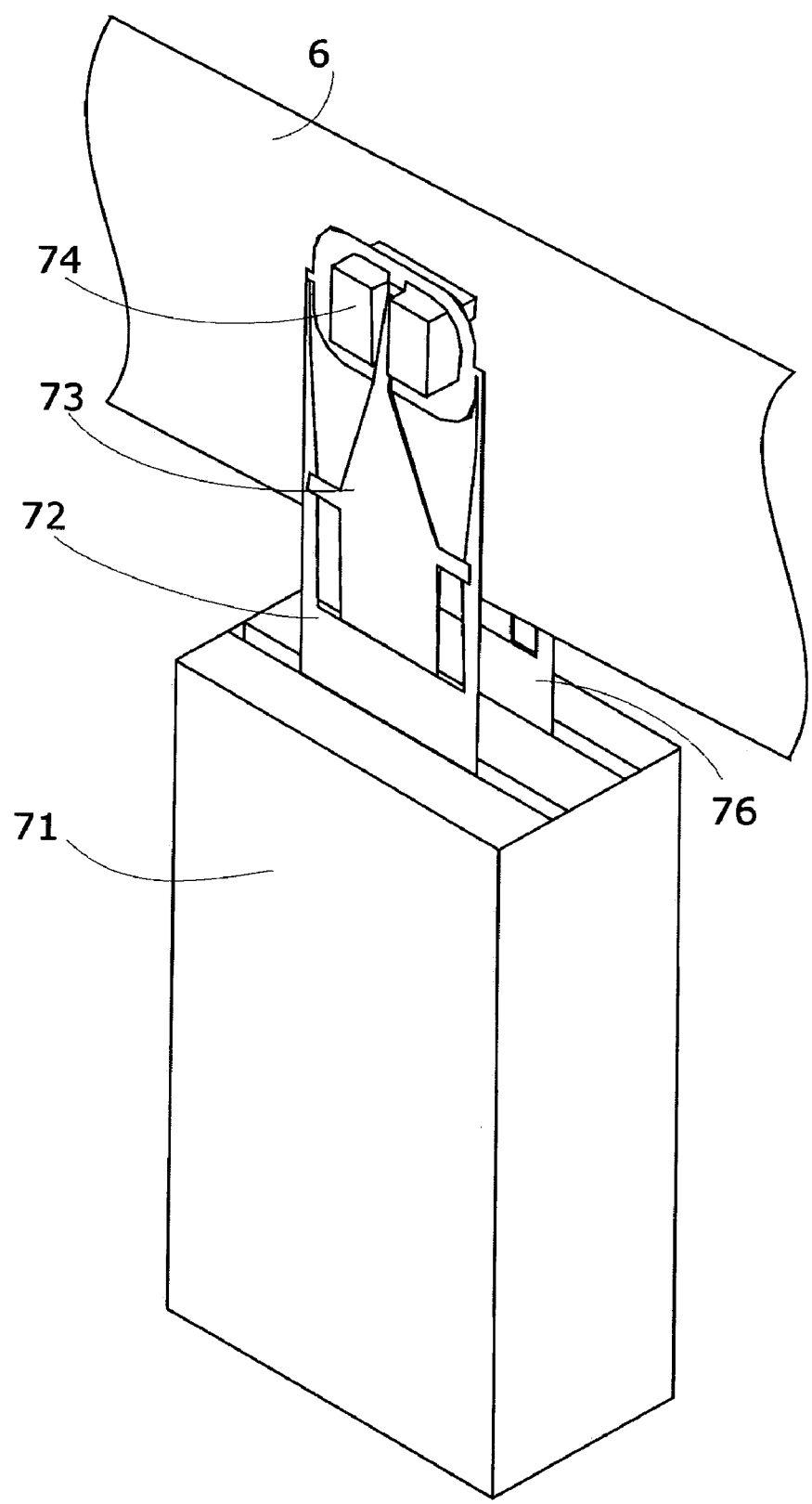
FIG. 7*b* shows the head assembly including the tape.

Referring now to FIGS. 7a and 7b, the housing 71 containing the actuator has two openings 77. Flexures 72 and 76 are movably attached to the actuator through the openings 77. Flexure 72 has read-write head 74 attached, and flexure 76 has tape-guiding block 75 attached. The actuator moves the flexures with the attached head and guide block laterally to the tape as indicated by arrow A. The tape 6 is positioned between the head 74 and the tape-guiding block 75 as shown in FIG. 7b. Load springs 73 and 78 push head and the tape-guiding block towards each other. In the preferred embodiment the surface of the head block matches the surface of the tape-guiding block. It is important that the head remains in close contact with the tape. This requires that the head and the tape-guiding block are substantially parallel to each other. The flexures allow movement of the head block and the tape-guiding block. Under the pressure of the springs, the surfaces of both blocks will be substantially parallel. Use of flexures combined with the springs is very advantageous, because manufacturing tolerances, wear of components after prolonged use, and other factors do not disturb the alignment of the read-write head to the tape-guiding block.

The tape generates air currents around it as it moves. As tape speed increases the air currents moving with the tape cause an air film to develop between the head surface and the tape, lifting the head off the tape surface. This separation between the tape and the recording head must be very accurately controlled. A very small separation can be tolerated and may even be desirable to reduce the friction between the tape and the head and to thereby reduce the tape and the head wear. With increased recording density, the distance of the separation between the tape and the recording head must be kept within tight parameters. In order to decrease recording time the speed of the tape has been increased in newer tape drives. The increased tape speed may cause an increase of the thickness of the air cushion between the head and the tape and therewith creates an even wider separation of the head and the tape. By selecting springs 73 and 78 with sufficient force to counteract the separating force of the air cushion, the separation of the head and the tape can be kept to a desired minimum for any tape speed and for any tape tension.

It is an additional advantage of the invention that a second read-write head can replace tape-guiding block 75 if dual-sided recording is desired.

Figure 8:
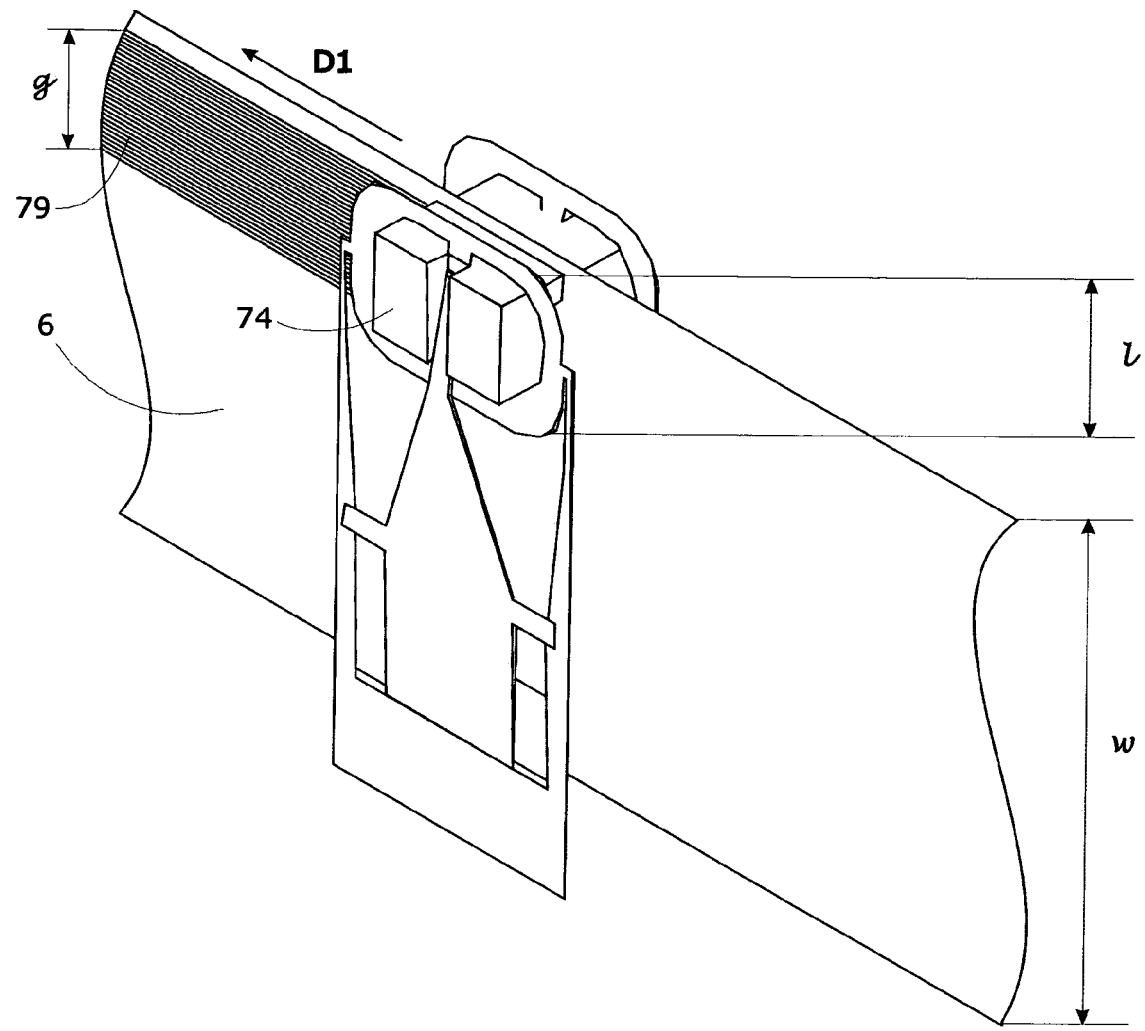
FIG. 8 illustrates the size of the inventive head.

FIG. 8 illustrates the size of the read-write head. While the tape is moving in direction of arrow D1, track group 79 is accessed. Track group 79 consists of a plurality of data tracks. The data tracks may be recorded or read simultaneously, or track group 79 may be accessed in a serpentine fashion as explained above. FIG. 8 shows that the length l of the read-write head 74 is considerably smaller than the width w of the tape and that it also substantially matches the width g of a recording group. With the reduction in the size of the head, the mass of the read-write head is also substantially reduced from prior art. The very low mass of the read-write head enables fast track-following and thus allows further decreased track width.

FIG. 8 illustrates an additional benefit of the present invention. After access to track group 79 has been completed, the head is moved and a different track group is accessed. FIG. 8 shows that the head contacts only the area of the tape that is currently being accessed. Previously recorded areas and not-yet-recorded areas of the tape are not in contact with the head. This results in substantially reduced tape wear and head wear.

A second embodiment will now be described.

Figure 9:
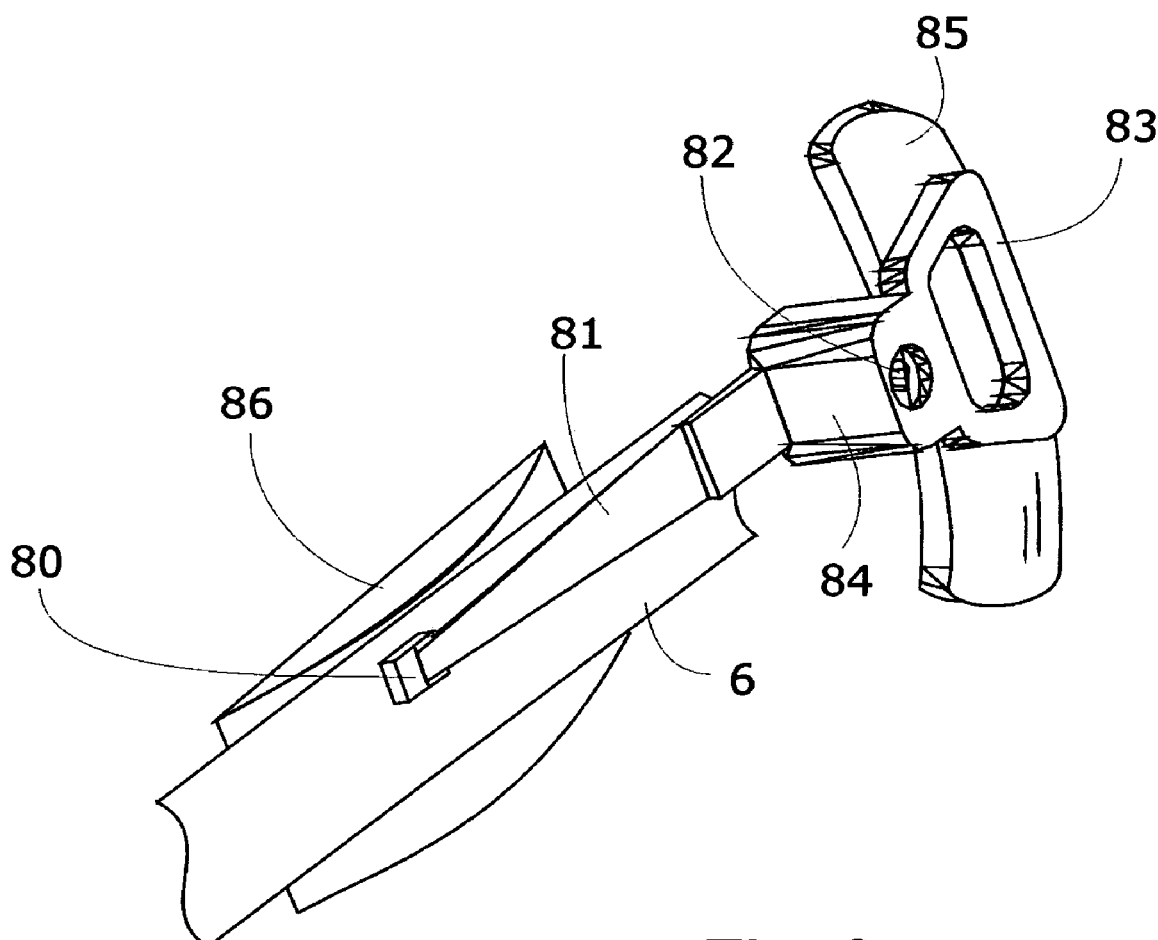
FIG. 9 is a depiction of a second embodiment of the invention.
Figure 10A:
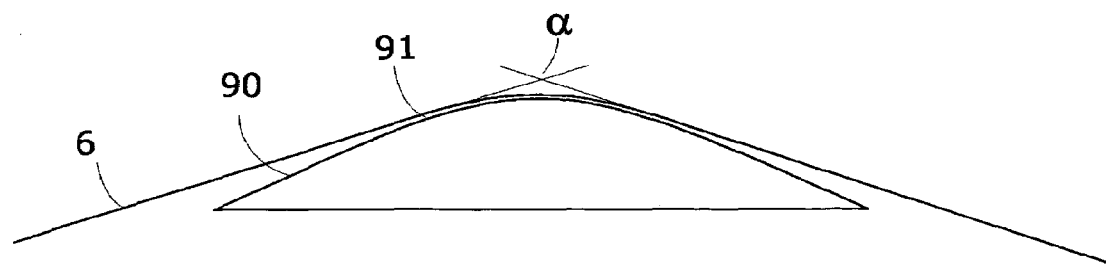
FIG. 10*a* depicts a stabilizer whereas the stabilizer is a hydrodynamic bearing.

FIG. 9 shows an example of the alternative embodiment. Read-write head 80 is attached to one end of a flexure 81. The other end of the flexure is attached to a pivoting actuator. In the preferred embodiment the flexure is biased so that it acts as a spring and pushes the read-write head 80 against the recording media 6. Alternatively, a spring can be added. Actuator base 84 pivots about center point 82. The magnetic force of electromagnet 83 against the magnetic force of permanent magnet 85 controls the movement of the pivoting actuator. Such actuators are commonly found in disk drives and are very well understood. They have many advantages, including the ability to move the read-write head at a high speed. The mass of the actuator with the attached head should ideally be evenly distributed about the pivoting point. But despite their advantages, these actuators have not been used in tape drives. Disk drives use ridged media that does not become distorted when the flexure 81 pushes the read-write head against it. However, tape is flexible in nature and tends to distort easily under pressure. Use of this system in a tape drive requires the tape to be stable and rigid in the area that is being accessed by the read-write head. This is accomplished by adding stabilizer 86. Stabilizer 86 comprises a curved surface over which the tape is moved. FIGS. 10a through 10d show several examples of stabilizers. In FIG. 10a the stabilizer is a hydrodynamic bearing. The moving tape generates an air film 91 that separates the tape 6 from the surface 90 of the hydrodynamic bearing and tape "flies" over the stabilizer. For added stability and column strength of the tape, the tape is preferably moved over the stabilizer at an angle α. The desired wrapping angle depends on many parameters.

The surface 90 is preferably made of a material that limits the wear of the tape during the start and stop operation. Tape tends to stick to surfaces, especially in humid and hot environments. The surface should therefore be such that it prevents such sticking.

Figure 10B:
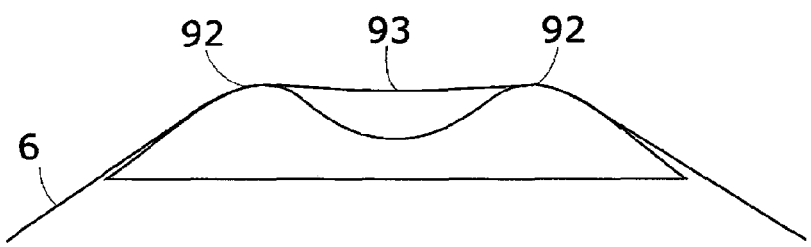
FIG. 10*b* depicts a stabilizer whereas the stabilizer is a dual bump hydrodynamic bearing.

FIG. 10b shows a dual bump hydrodynamic bearing. Each bump 92 acts as a hydrodynamic bearing. Tape is stabilized in area 93 between the bumps.

Figure 10C:
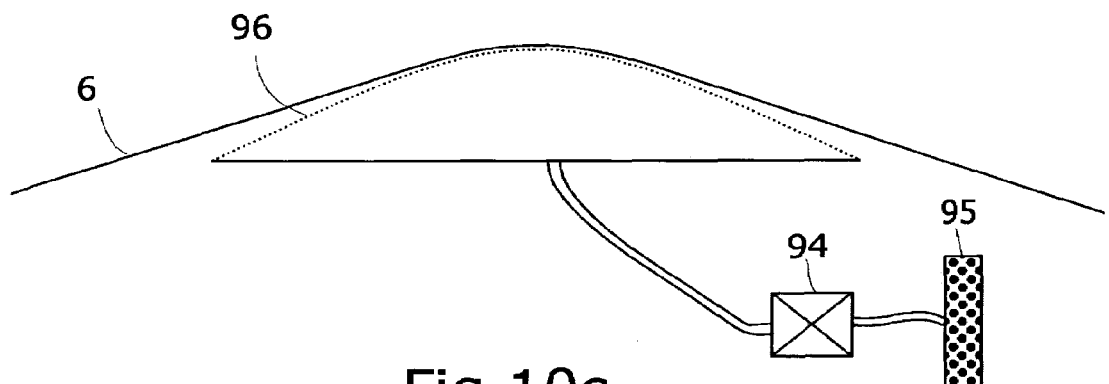
FIG. 10*c* depicts a stabilizer whereas the stabilizer is a hydrostatic bearing.

FIG. 10c shows a hydrostatic bearing. Pump 94 compresses air that is cleaned by filter 95. The pressurized air escapes through small openings in the bearing surface 96 and generates an air film that separates the tape from the bearing surface 96.

Figure 10D:
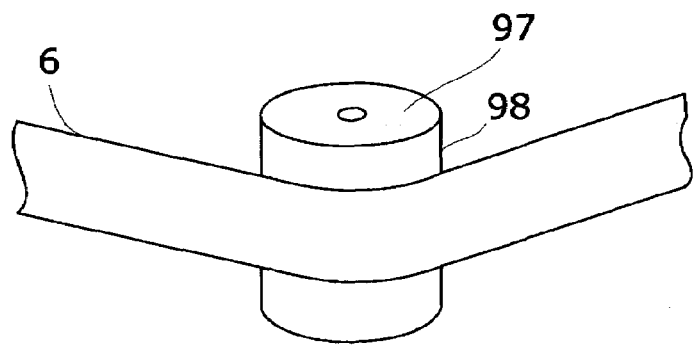
FIG. 10d depicts a stabilizer whereas the stabilizer is a roller bearing.

In FIG. 10d a roller 97 is used to stabilize the tape 6. In the preferred embodiment the roller surface 98 is made of porous material. The porous material prevents the development of an air film between the roller and the tape.

Figure 11A:
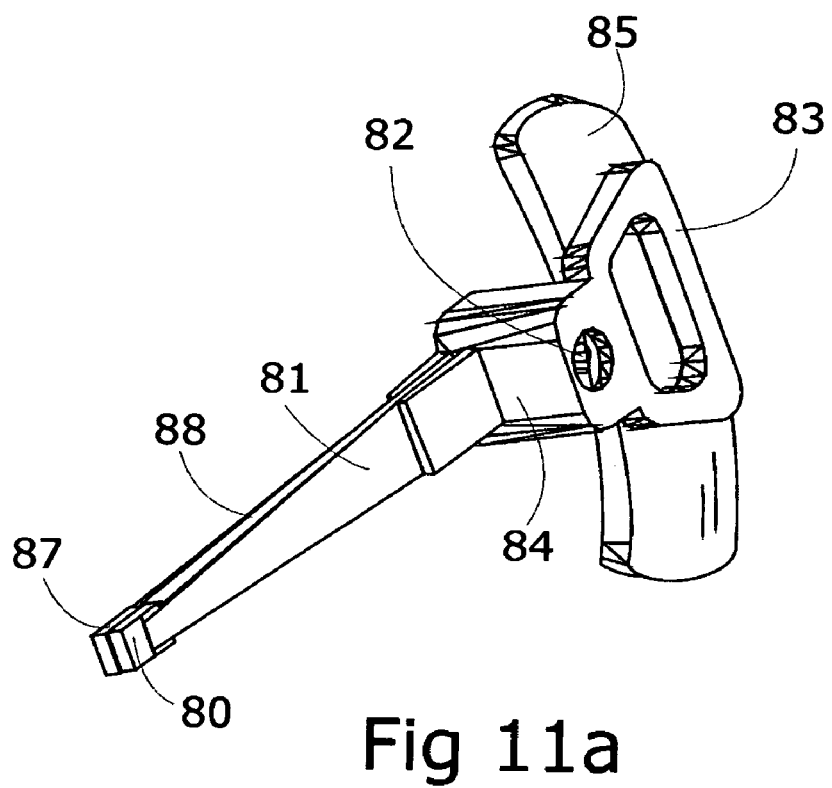
FIG. 11a shows a stabilizer whereas the stabilizer is a second flexure with an attached tape guide block.
Figure 11B:
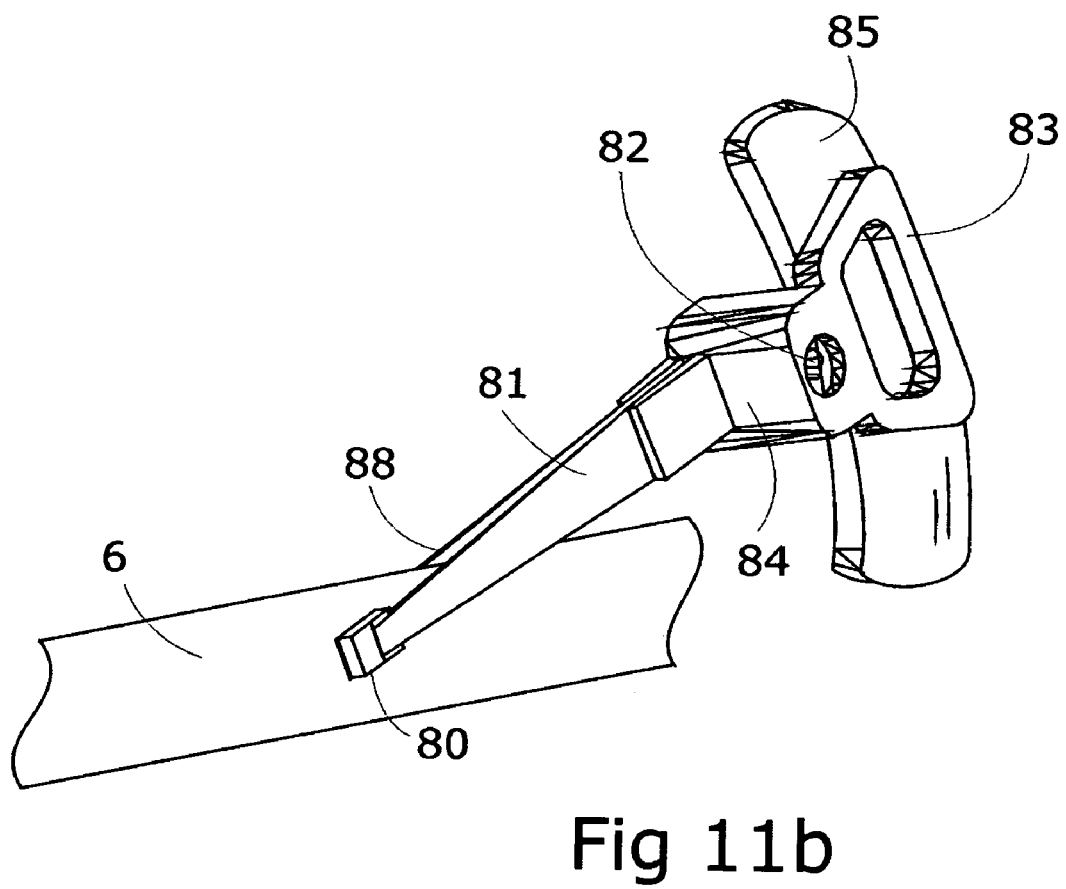
FIG. 11b shows a stabilizer whereas the stabilizer is a second flexure with an attached second read-write head.

A variation of the above method is shown in FIGS. 11a and 17b. Instead of a stabilizer a second flexure 88 is added. Flexure 88 is biased against flexure 81. Flexure 88 holds tape-guide block 87. As described above, a second read-write head may replace the tape-guiding block 87 if dual-sided recording is desired.

Although the later described implementation differs in many aspects from the first implementation, the size of the head is significantly less than the width of the tape in both implementations. The reduced mass of the head allows fast response to positioning errors. The separation between the head and the tape can be controlled even at high tape speeds, while the head and the tape wear are significantly reduced.

Both implementations require a separation between the head and the stabilizer while tape is threaded from the supply reel to the take-up reel. FIG. 9 shows the tape 6 between head 80 and stabilizer 86, while FIGS. 7a and 7b show the tape between flexure 72 with attached head 74 and flexure 76 with attached stabilizer or head 75. In both implementations the tape 6 is tightly held between the head and the stabilizer. When a reel or a tape cartridge is first loaded onto the tape transport, the free-end of the tape must be threaded between the head and the stabilizer. Similarly, before the tape is unloaded from the drive, the tape must be unthreaded. The free end of the tape may be attached to a tape leader or a pin. Most tape drives use a mechanism, such as an arm, to thread the free end of the tape from the supply reel to the take-up reel. The path of the thread mechanism must be unobstructed. A mechanism to move the head out of the thread path is required. Many variations of such a mechanism are possible.

In the following the preferred implementation will be described. Although the mechanism will only be described in reference to the first implementation of the invention, it is apparent that with minor modifications the same mechanism can be adapted for the second implementation of the invention.

Figure 12:
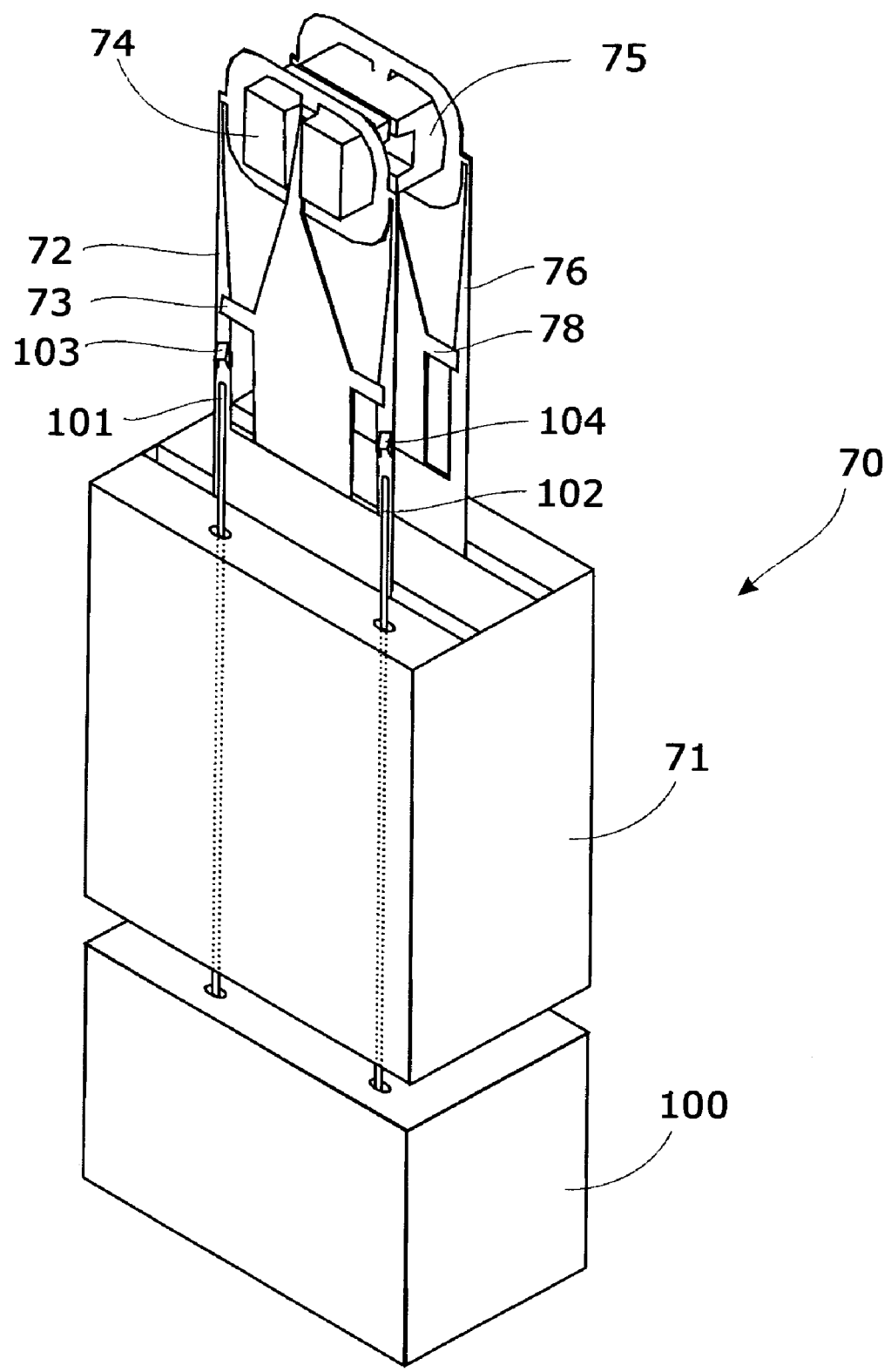
FIG. 12 shows the inventive read-write system with attached solenoid.

FIG. 12 shows read/write head system 70 with attached solenoid 100. Four rods are movably attached to solenoid 100. Rods 101 and 102 are visible in FIG. 12. The rods extend through the actuator base 71, as shown by dashed lines. Sloped guides 703 and 104 are attached to flexure 72. Sloped guides are also attached to flexure 76, but are not visible in FIG. 12. One end of each rod is attached to the solenoid 100 while a second end is free.

The solenoid has two positions. FIG. 12 shows the retracted position. The free ends of the rods are outside of the sloped guides in the retracted position. In the retracted position springs 73 and 78 urge flexures 72 and 76 towards each other and read-write head 74 and stabilizer 75 hold tape 6 (not shown) tightly.

FIG. 13 show a side view. In the side views rods 102 and 105, and sloped guides 104 and 106 are visible. The operation will now be explained with reference to FIG. 13.

Figure 13A:
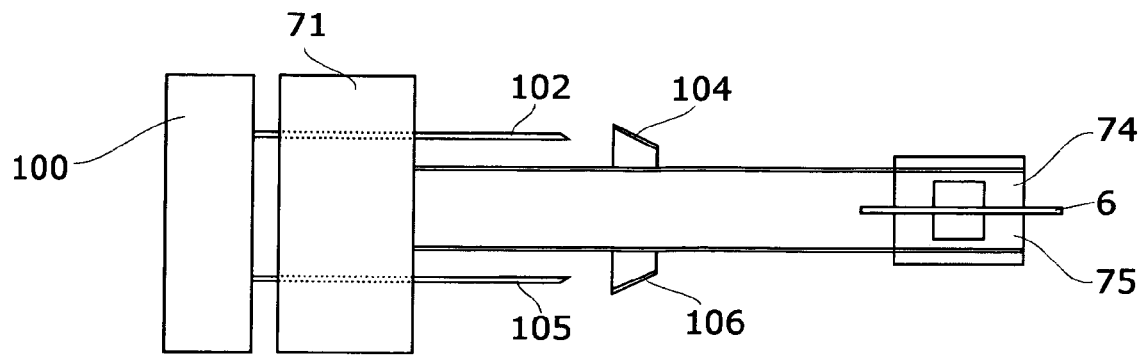
FIG. 13a shows the side view before the head is moved.

FIG. 13a shows the retracted position with the free ends of the rods 102 and 105 outside of sloped guides 104 and 106. When the solenoid is activated, the free end of the rods is moved forward as indicated by arrow D3 in FIGS. 13b and 13c. As the rods move forward, they enter the sloped guides.

Figure 13B:
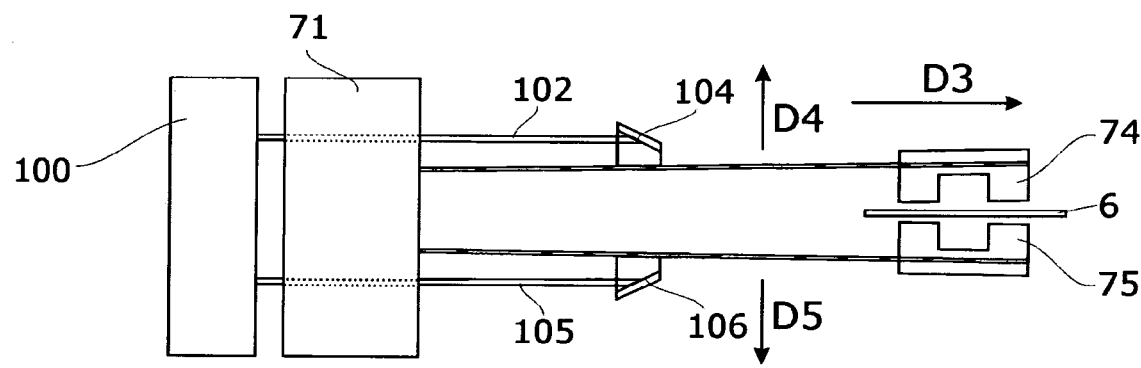
FIG. 13b shows a new position of the head when rods enter sloped guides

In FIG. 13b rod 102 has entered sloped guide 104 and rod 105 has entered sloped guide 106. As the rods move into the sloped guides, the guide 104 is moved in direction of arrows D4 and guide 106 is moved in direction of arrow D5. This causes the flexures and attached head 74 and attached stabilizer 75 to separate.

Figure 13C:
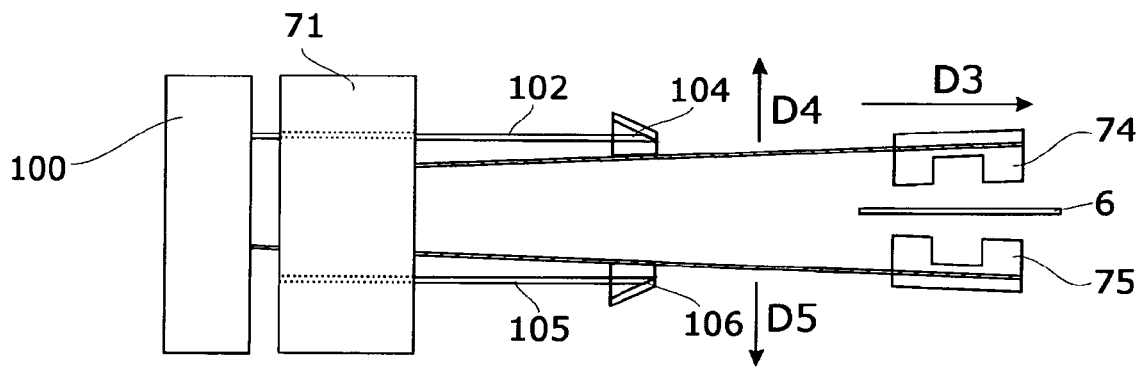
FIG. 13c shows the head position after the rods further entered the sloped guides.
Figure 13D:
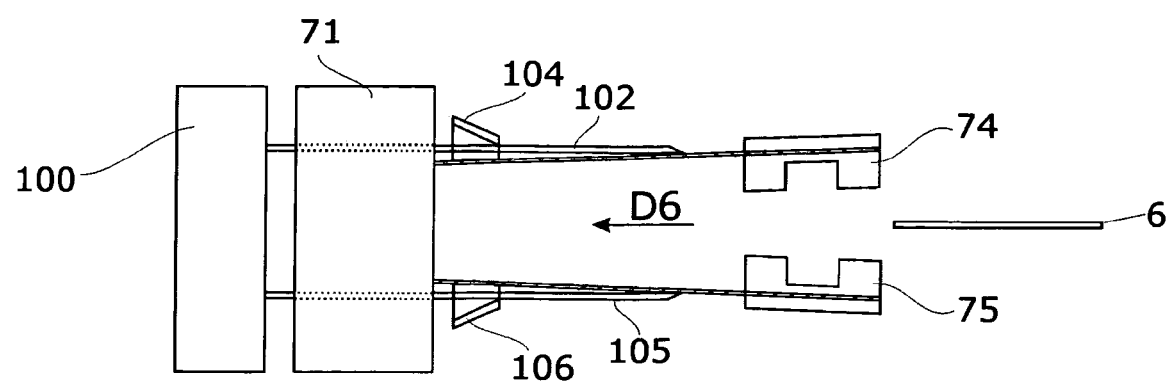
FIG. 13d shows the head position after the head has been moved from the tape path.

In FIG. 13c the rods have further entered the sloped guides. The read-write head is further separated from the stabilizer and tape 6 is no longer trapped between the head and the stabilizer. The flexures with the attached head and stabilizer are now moved in direction of arrow D6 by actuator 71 as shown in FIG. 13d. After the completion of this movement, the head and stabilizer have cleared the thread path. A suitable threading mechanism can now be used to unthread the tape.

When the tape is first loaded the above operations are performed substantially in reverse. With the head and stabilizer moved out of the threading path of the tape, the tape is threaded through the tape path. Then actuator 71 moves the flexures with the attached head and stabilizer so that the head and the stabilizer are positioned on opposite sides of the tape. Solenoid 100 retracts the rods from the sloped guides and the springs 73 and 78 (as shown in FIG. 7) urge head 74 towards the stabilizer 75.

Although the present invention has been described with reference to preferred embodiments, numerous modifications and variations may be made and the result will still come within the scope of the invention. No limitation with respect to the specific embodiments disclosed herein is intended or should be inferred.

The invention claimed is:
1. In a tape recording device, comprising:
a supply reel and a take-up reel, a head for recording data to the tape or reading data from the tape or both, a servo system capable of moving the tape between the supply reel and the take-up reel past said head;
a recording system, comprising:
an actuator capable of moving said head across the recording surface of said tape;
a flexure having a first end attached to the head and a second end attached to the actuator;

whereas the flexure allows the head to move towards the tape; and whereas the flexure is biased against the tape and therefore urges the head towards the tape; and whereas the flexure allows the head to move so that the head surface is substantially aligned with the tape surface.

2. A tape recording device of claim 1 additionally comprising a spring;

whereas the spring enhances the bias of the flexure.

3. A tape recording device of claim 1 further comprising a means to stabilize the tape at the recording area.

4. A tape recording device of claim 3, whereas the means to stabilize the tape is a hydrodynamic bearing.

5. A tape recording device of claim 3, whereas the means to stabilize the tape is a dual bump hydrodynamic bearing and the stabilized area is between the two bumps.

6. A tape recording device of claim 3, whereas the means to stabilize the tape is a hydrostatic bearing.

7. A tape recording device of claim 3, whereas the means to stabilize the tape is a roller bearing.

* * * * *